Dec. 15, 1931.　　　A. H. KING　　　1,836,602
SPEED CHANGE DEVICE
Filed Nov. 21, 1928　　　2 Sheets-Sheet 1

INVENTOR
Alexander H. King
BY
Mitchell & Bechert
ATTORNEYS

Dec. 15, 1931.  A. H. KING  1,836,602
SPEED CHANGE DEVICE
Filed Nov. 21, 1928    2 Sheets-Sheet 2

INVENTOR
Alexander H. King
BY
Mitchell + Bechert
ATTORNEYS

Patented Dec. 15, 1931

1,836,602

UNITED STATES PATENT OFFICE

ALEXANDER H. KING, OF WEST HARTFORD, CONNECTICUT, ASSIGNOR TO THE PRATT & WHITNEY AIRCRAFT CO., OF HARTFORD, CONNECTICUT, A CORPORATION OF DELAWARE

SPEED CHANGE DEVICE

Application filed November 21, 1928. Serial No. 320,817.

This invention relates to speed change devices, and in particular to a gear type speed reduction unit for an aircraft engine.

A primary object of the invention is to provide a gear reduction unit interposed between the crank-shaft and propeller shaft of an aircraft engine which will be simple in construction and efficient in operation.

Another object of the invention is to provide the crank-shaft of an aircraft engine with a driving gear on its outer or forward end adapted to mesh with a driven gear mounted upon a forwardly extending shaft, improved antifriction bearings being provided for rotatably supporting the driving and driven shafts.

Another object of the invention is to provide a supporting member or members for bearings mounted adjacent the driving and driven gears of a speed reducing unit, so that the shafts mounting these gears will be maintained in exactly correct position and be free to rotate with a minimum of friction.

A feature of importance of the invention is that an intermediate supporting member may be provided extending between an opening between the driving and driven gears and having antifriction bearings thereon disposed out of alignment with each other, one bearing supporting the outer or forward end of the driving shaft and the other bearing supporting the inner or rear end of the driven shaft.

And finally it is an object of importance to provide rigid supporting members for antifriction bearings supporting the driving and driven shafts closely adjacent the intermeshing gears mounted on these shafts and so disposed in the engine frame members that the members of the device may be conveniently disassembled and reassembled.

With the above and other objects in view my invention comprises the features of construction and operation set forth in the following specification and illustrated in the accompanying drawings.

In the drawings—

Figures 1, 2:
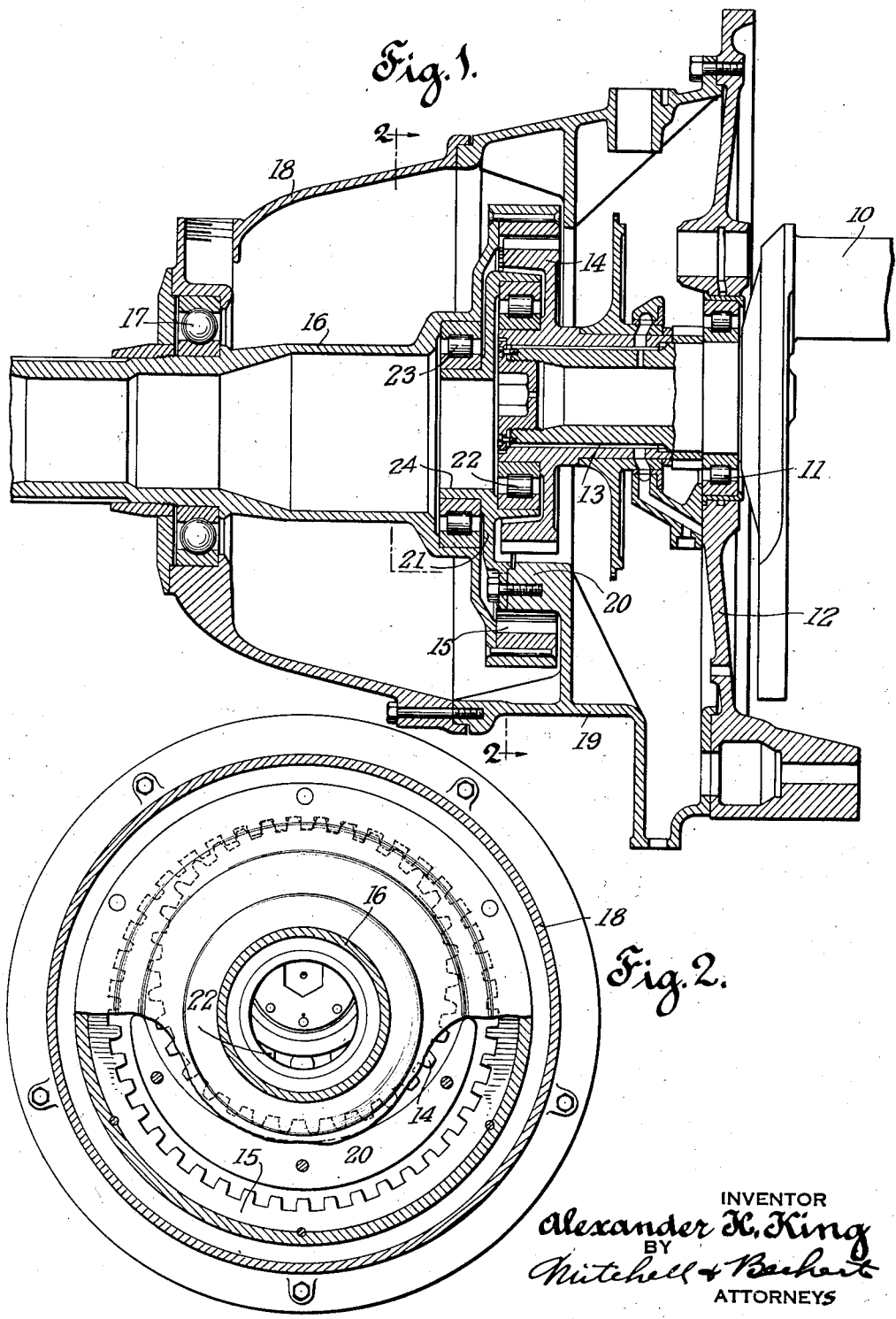
Fig. 1 is a longitudinal sectional view through the forward end of an aircraft engine showing my improved form of speed reducing device applied thereto.
Fig. 2 is a transverse sectional view taken upon the plane of line 2—2 of Fig. 1.

In the above mentioned drawings I have shown two embodiments of my invention applied to aircraft engines, but it will be understood that the invention can be otherwise embodied and that the drawings are not to be construed as defining or limiting the scope of the invention, the claims appended to this specification being relied upon for that purpose.

In aircraft power units it is frequently desirable to operate the engine at one speed and its propeller at another and usually reduced speed. One engine may be used in a large variety of aircraft requiring for their efficient operation propellers having widely different characteristics. The speed change unit forming the present invention is adapted to provide any desired speed ratio between the engine crank-shaft and its propeller, depending upon the choice of gears, and the design is such that it will permit a wide selection in the members so that the unit may be designed for any one of a large number of ratios.

Referring more in detail to the figures of the drawings the forward end of the crank-shaft 10 of an aircraft engine is shown rotatably mounted upon a suitable bearing 11 in the front crank case section 12 of the engine. The crank-shaft 10 extends forwardly through this crank casing 12 and is provided on its free outer end with a plurality of splines 13. Upon these splines 13 is mounted a suitably splined spur gear 14. In mesh with this spur gear 14 is an internal gear 15 within the rear end of a forwardly extending hollow shaft or sleeve 16. Upon this sleeve 16 at its forward end which may be suitably splined is mounted the propeller hub (not shown). This shaft 16 is hollow merely for the purpose of reducing its weight. Upon the intermediate portion of this shaft 16 is provided a suitable bearing 17 preferably of the antifriction type. The inner ring of this antifriction bearing 17 directly engages a portion of the sleeve or hollow shaft 16, and the outer ring is held in position within the forward engine housing or closing member 18.

Referring first to the embodiment of the invention shown in Figs. 1 and 2, the forward engine housing member 12 and the front member 18 of the crank case have disposed between them an intermediate frame member 19. This frame member 19 is attached at its periphery as shown to the members 12 and 18. This member 19 has an inwardly projecting portion 20 extending within the crescent shape opening between the driving and driven gears 14 and 15. Upon the forward face of this projection 20 is mounted an intermediate supporting member 21. Mounted within a rear circular recess in this auxiliary supporting member 21 is an antifriction bearing 22, the outer ring of which directly engages this recess and the inner ring engages the hub of the driving gear 14 as shown clearly in Fig. 1. The driving gear 14 which is of the spur type has its web disposed so that it forms a hub upon its forward side. The bearing 22 therefore is housed or enclosed by the driving and driven gears 14 and 15. Also mounted upon this auxiliary supporting member 21 upon a forwardly extending and circular projection 24 is an antifriction bearing 23 for rotatably supporting the rear end of the driven shaft 16. The inner ring of this bearing 23 directly engages the projection 24 and the outer ring engages a circular recessed portion of the hollow shaft 16 adjacent the driven gear 15. It will be seen from the above that the forward extending portion of the driving shaft 10 and the rear end of the driven shaft 16 are rotatably mounted upon antifriction bearings 22 and 23 rigidly supported and properly maintained in relative positions by the auxiliary supporting member 21 on the intermediate engine frame member 19. The teeth of the internal driven gear 15 may be formed upon an annular member pressed into the rear end of the driven member 16 and held in fixed position therein by suitable pins as shown in Fig. 1.

Figure 3:
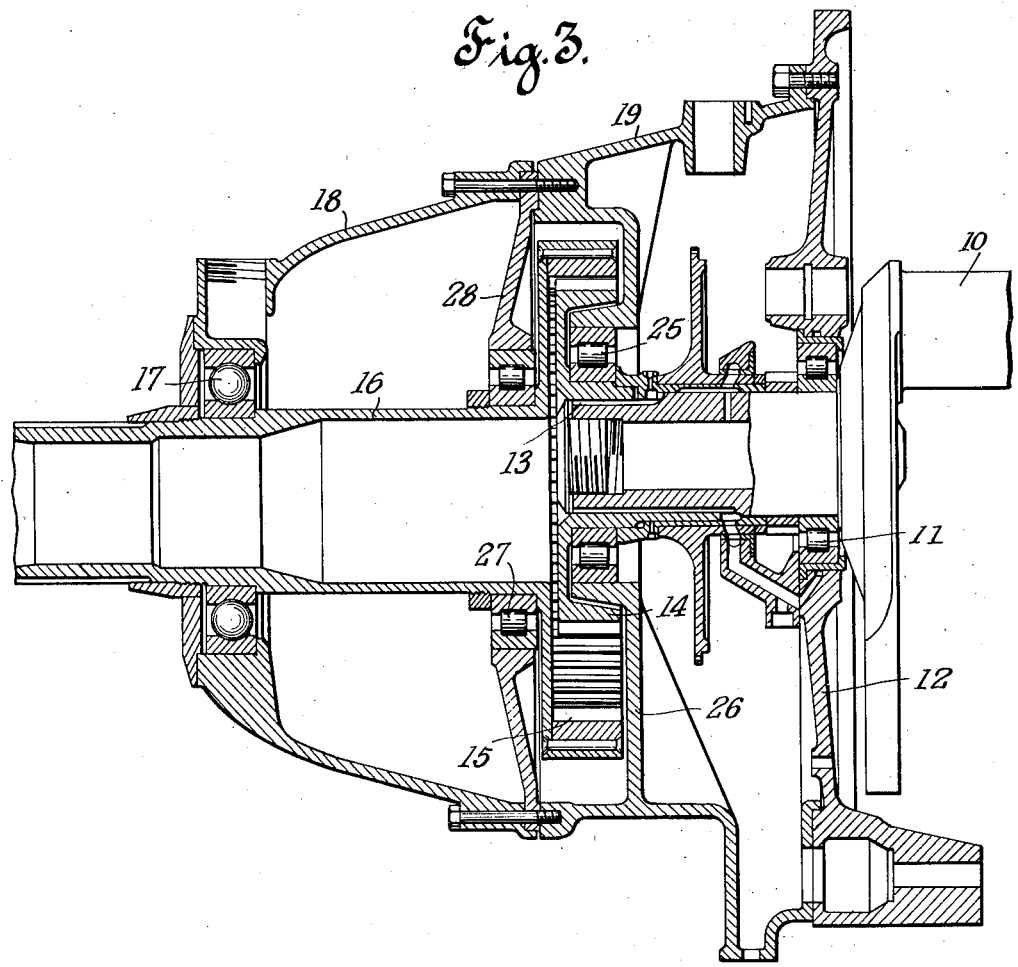
Fig. 3 is a view similar to Fig. 1 showing a modified form of the construction.

Referring to the modified form of the invention shown in Fig. 3, it will be noted that the bearing 25 for the driving gear 14 and the forward end of the driving shaft 10 has its outer race mounted upon an inwardly extending flange portion 26 of the intermediate frame member 19 disposed between the forward housing member 18 and the front portion of the crank case 12. Its inner race is mounted upon the hub of the driving gear. The driven shaft 16 is supported closely adjacent the driven gear 15 by a bearing 27 in the inwardly extending flange member 28 securely fastened in position between the forward housing member 18 and the intermediate frame member 19. The position of the bearings 25 and 27 is the same as in Fig. 1, but the bearings are supported in Fig. 3 individually upon separate members forming parts of the engine frame rigidly secured together.

I claim:

1. A speed changing device comprising in combination, a driving shaft and a driven shaft, intermeshing gears respectively on said driving and driven shafts, engine frame members for rotatably supporting said shafts rigidly secured together, a bearing in each of said members, one of said bearings being disposed adjacent the end of said driving shaft, an intermediate frame member attached at its periphery to said engine frame members, and another bearing being disposed adjacent said driven gear and mounted upon said intermediate member.

2. A speed change device comprising in combination, a driving shaft and a driven shaft, intermeshing gears respectively on said driving and driven shafts, engine frame members for supporting said shafts at spaced points, a bearing in each of said members, an intermediate frame member, a supplementary supporting member associated therewith, adjacent bearings in said last mentioned members, one of said bearings being disposed adjacent the end of said driving shaft and housed within said gears, and another bearing therein disposed adjacent said driven gear upon said driven shaft 3. A speed change device comprising in combination, a driving shaft, a driven shaft, intermeshing gears on said shafts, engine frame members having bearings therein for said shafts, an intermediate frame member having an intermediate supporting member attached thereto and extending through a space between said gears, and bearings on said intermediate member for the adjacent ends of said driving and driven shafts.

4. A speed change device comprising in combination, a driving shaft, a driven shaft, intermeshing gears on the adjacent ends of said shafts, engine frame members for supporting said shafts, bearings in said frame members for supporting said shafts, an intermediate frame member, a supplementary supporting member on said intermediate frame member for the adjacent ends of said shafts and having bearings thereon, one of said bearings engaging a hub of said driving gear and a second bearing thereon engaging said driven shaft adjacent its gear.

5. A speed change device comprising in combination, a driving shaft, a driven shaft, intermeshing gears on said shafts, engine frame members having bearings mounted directly therein for said shafts, an intermediate frame member attached at its periphery to said first mentioned frame members, an intermediate supporting member attached to said intermediate frame member and extending through a space between said gears, a bearing on said intermediate member for said driving shaft adjacent its end, and another bearing thereon for said driven shaft adjacent said driven gear.

6. A speed change device comprising in combination, a driving shaft, a driven shaft, intermeshing gears on the adjacent ends of said shafts, one of said gears being internal, engine frame members rigidly secured together at their periphery for supporting said shafts, rotatably upon parallel axes, bearings mounted directly in said frame members for supporting said shafts, a supplementary supporting member for the adjacent ends of said shafts extending through the space between said driving and driven gears, said supplementary supporting member being attached to one of said frame members and having bearings thereon, one of said bearings engaging a hub of said driving gear, and the other bearing thereon engaging said driven shaft adjacent its gear.

ALEXANDER H. KING.